UNITED STATES PATENT OFFICE.

BERN L. BUDD, OF FAIRFIELD, CONNECTICUT.

IMPROVEMENT IN COMPOSITION EMERY-PASTE.

Specification forming part of Letters Patent No. 190,125, dated May 1, 1877; application filed March 14, 1877.

*To all whom it may concern:*

Be it known that I, BERN L. BUDD, of the town and county of Fairfield, in the State of Connecticut, have invented a new and useful Composition Emery-Paste, which composition is fully described in the following specification:

This invention relates to that class of composition used to remove rust or stains from highly-polished iron or steel tools, implements, instruments, and the like, without injuring the articles themselves, and for and by applying it to the surface of leather, putting a fine edge upon razors, surgical instruments, or other cutting implements.

To prepare the emery-paste, I first provide myself with a glass tube two inches in diameter and thirty inches long. At the lower end of this tube is fitted a large glass stop-cock, and the upper end closed with a tightly-fitting cork. The tube is graduated from below upward. I now place in this tube a pound of what is known in commerce as the finest washed emery, and then note by the graduation on the tube the space it occupies. I then fill the tube with alcohol, close the stop-cock, and insert the cork in its place. I now shake the tube vigorously and agitate the mixture until the emery is thoroughly mixed through the alcohol. I now place the tube in a suitable stand in a vertical position, with the stop-cock down. Of course, the emery begins to settle, the heavier particles falling first. I wait until, consulting the graduations upon the tube, I find that about one-half of the emery has subsided. I then open the stop-cock and allow this portion to escape. This I discard. The remainder of the emery being so very fine, is, of course, a very much longer time in settling. As soon as it has all subsided and the alcohol above is perfectly clear, I again open the stop-cock and draw off the fine emery, leaving the alcohol in the tube for the next batch. I catch the emery as it flows from the tube in a porcelain dish, place it over a water-bath and evaporate to perfect dryness. I then ascertain the weight of emery I have in the dish, and add to it one-half its weight of vaseline. I then heat the entire mass (over the water-bath) until it is of a uniform temperature throughout, stirring the mixture constantly with a porcelain spatula. After thoroughly mixing in this way I transfer it in small quantities at a time to a glass slab previously heated in boiling water, and with a glass muller, also previously warmed, I levigate until it is perfectly smooth and free from lumps.

I regard this composition as peculiarly adapted for the purposes indicated above, and the fact that the vaseline never becomes rancid nor oxidizes, allows of the paste being kept unchanged for an unlimited time.

I do not wish to be understood as confining myself to the proportions of emery and vaseline I have indicated. I have made the paste in a variety of proportions, and find them all good; but I give a preference to the proportions specified.

Having thus described my invention, what I claim as new, and desire to secure by Letters Patent, is—

A composition of emery and vaseline, substantially as and for the purpose specified.

BERN L. BUDD.

Witnesses:
 THOMAS C. CONNOLLY,
 SAML. GROVER.